Jan. 2, 1968  N. LAING  3,361,341

ELECTRIC MOTOR DRIVEN FLUID FLOW MACHINES

Filed June 15, 1966  5 Sheets-Sheet 1

INVENTOR
Nikolaus Laing
BY
ATTORNEYS

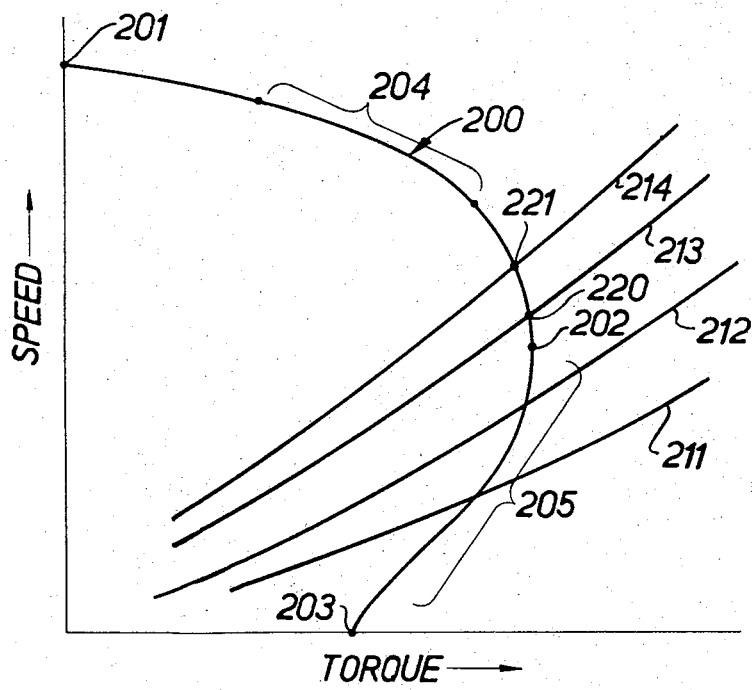

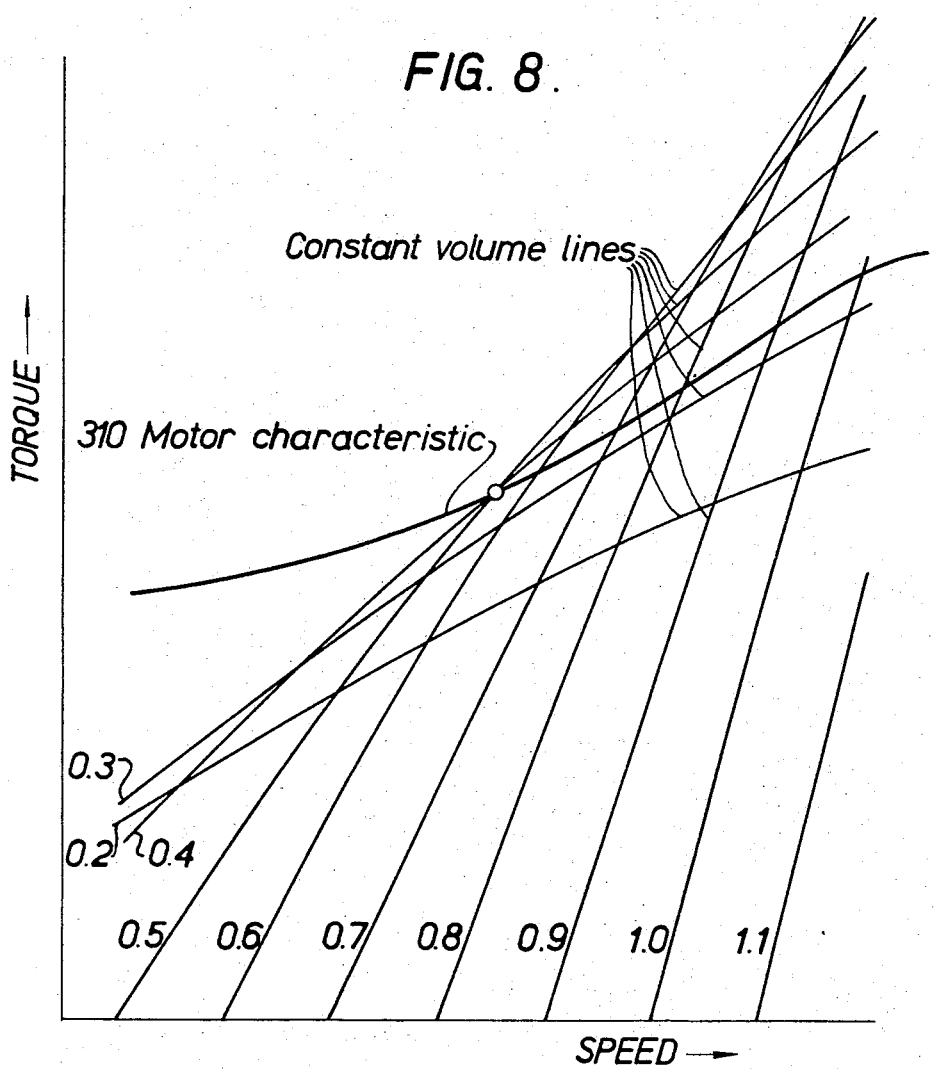

Jan. 2, 1968   N. LAING   3,361,341
ELECTRIC MOTOR DRIVEN FLUID FLOW MACHINES
Filed June 15, 1966

INVENTOR
Nikolaus Laing

United States Patent Office 3,361,341
Patented Jan. 2, 1968

3,361,341
ELECTRIC MOTOR DRIVEN FLUID FLOW MACHINES
Nikolaus Laing, Aldingen, near Stuttgart, Germany, assignor to Laing-Vortex, Inc., New York, N.Y., a company
Filed June 15, 1966, Ser. No. 557,727
3 Claims. (Cl. 230—117)

The application is a continuation in part of my copending application No. 458,063 dated May 24, 1965, now abandoned, which itself was continuation-in-part of my copending application No. 858,217 filed Dec. 8, 1959, now abandoned.

This invention relates to electric-motor driven fluid flow machines.

It is sometimes desired for a pump or blower to deliver a given throughput independent of variations in the resistance of the system with which it is working. Thus, an equipment may require a constant throughput notwithstanding the gradual clogging of filters, or a burner may require a fixed air supply notwithstanding variation in the draught of a chimney with which it is connected.

The invention makes use of the combination of a fluid flow machine of the cross-flow, preferably "tangential," type, and an electric driving motor therefor.

A fluid flow machine of the cross-flow type comprises a bladed cylindrical rotor mounted for rotation about its axis and guide means extending the length of the rotor and defining therewith suction and pressure regions, the guide means and rotor cooperating on rotation of the latter in predetermined direction to set up a flow of fluid through the rotor generally transverse to the rotor axis from the suction region through the path of the rotating blades of the rotor to the interior of the rotor and thence again through the path of the rotating blades of the rotor to the pressure region. In a "tangential" machine the guide means and rotor cooperate on rotation of the latter in predetermined direction to set up a vortex of Rankine type having a core region inter-penetrating the path of the rotating blades of the rotor at a location eccentric of the rotor axis and between the suction and pressure regions. Various forms of "tangential" fluid flow machines are discussed in British Patent 876,611.

The invention is based on the appreciation that in the cross-flow or "tangential" machine the power taken drops sharply as the machine is progressively throttled, in contrast to for example an axial flow fan where the power taken may actually rise, or a centrifugal fan where the power taken falls only slightly with throughput.

An A.C. induction motor for example a shaded pole motor has in general a torque/speed characteristic of a particular type: at synchronous speed the torque is zero and as the speed drops the torque increases down to the stalling speed, after which, in the stalling range the torque decreases again. The stalling range is unstable, in the sense that a torque well below the maximum torque can stop the motor. At speeds around the stalling speed any increase in torque brings about a big drop of speed. Consequently a motor is normally designed in relation to its load such as to operate well above the stalling speed where increase in torque causes only a modest speed drop.

The present invention however, by contrast with the preconceptions in the art, proposes that, in a combination of flow machine of the cross flow type and motor having a characteristic of the type described, together with a system having a resistance which varies with time the motor should operate at points in the characteristic where speed varies greatly with torque. Then as the system resistance increases and the machine becomes throttled the power taken tends to drop. Under reduced load the motor speed tends to rise: this in turn increases the pressure developed by the flow machine (which rises with the square of the speed), and tends to bring the throughput back to the required value. It is to be understood that this effect is entirely due to the sharp drop in power taken by the cross flow fan on throttling, and is valuable only in the context mentioned, that is where constant volume is desired in a system with changing resistance.

A similar approximation to constant throughout using hitherto conventional flow machines, such as axial or centrifugal fans, would be possible only with the aid of complicated regulating devices.

In one form of the invention using an A.C. induction motor, the motor and flow machine are matched so that the motor operates in the region of its characteristic which is around the stalling speed. The main point here is to operate where the motor characteristic has a substantial slope, i.e., near and below the stalling point rather than in the range normally used which is well above the stalling point when the slope is much less.

A further form of the invention has been developed on the basis of detailed experimental and theoretical investigations of the behaviour of "tangential" fans and induction motors under varying conditions. In this further form of the invention the motor is chosen so that its characteristic in the stalling range is substantially coincident with a desired constant-volume line for the fan plotted on a torque-speed graph; this will later be explained in detail. Ideally such a combination will result in constant throughput over a range of variations of system resistance. In practice nearly constant pressure can be obtained in this way.

It is not necessary to the practice of the invention that the motor should be of A.C. induction shaded pole type, though this will commonly be preferred.

The invention will be further described with reference to the accompanying drawings in which:

FIGURE 5 is a graph showing a characteristic curve (speed plotted against torque) of a conventional A.C. shaded pole motor and power absorption curves for a cross flow fan;

FIGURES 6 to 10 illustrate the theoretical basis of the invention in its developed form;

FIGURE 6 is a series of pressure/throughput curves and a series of curves of constant throttle for a system with motor-blower combination as shown in FIGURES 1 and 2 and designed as will be described;

FIGURE 7 is a series of torque/throughput curves corresponding to FIGURE 6;

FIGURE 8 shows a series of constant-volume lines plotted as a torque/speed graph, and showing the motor characteristic superimposed;

FIGURE 9 shows the characteristic (i.e., pressure/throughput) curve for the system with motor/blower combination as described, compared with the characteristic for a similar combination driven at constant speed; and FIGURE 10 is a group of characteristic curves for different conventional forms of A.C. shaded pole induction motors.

Figure 1:
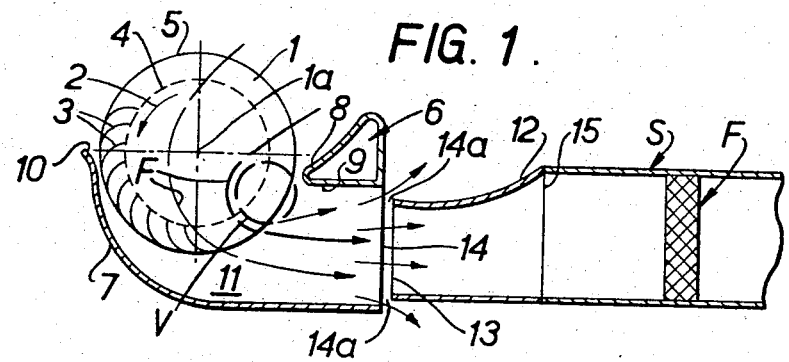
FIGURES 1 and 2 are respectively a cross-sectional and a partial axial sectional view of a system having a resistance which varies with time coupled with a motor-blower combination.
Figure 2:
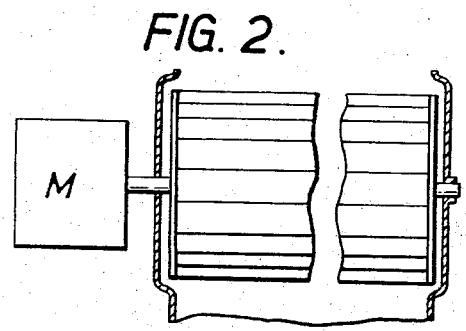

Referring now to FIGURES 1 and 2 the "tangential"

fluid machine there shown comprises a hollow cylindrical bladed rotor designated generally 1 which is supported for rotation about its axis 1a and driven in the direction of the arrow 2. The rotor comprises a series of similar blades 3 extending parallel to the rotor axis and arranged in a ring thereabout so that the inner and outer edges of the blades lie on the inner and outer cylindrical envelopes 4, 5 centered on the rotor axis. The blades are concave facing the direction of rotation, with the outer edges leading. Guide means are provided to cooperate with the rotor 1 and comprise a guide body 6 and a guide wall 7 both extending the length of the rotor. The guide body 6 presents to the rotor, but well spaced therefrom, a rounded nose 8 merging into a plane wall 9 extending away from the rotor. The guide wall 7 has its line 10 of nearest approach to the rotor about opposite the nose 8 and well spaced therefrom; an arcuate portion of the wall diverges continuously from the rotor, going from this line 10 and merges with a plane portion extending parallel with the wall 9 and defining therewith an outlet passageway 11 of constant cross-section. End closure means are provided for the rotor 1 and the guide means.

In operation of the machine as so far described, the rotor 1 and guide means cooperate to set up a vortex having a core indicated schematically at V which is eccentric of the rotor axis and which inter-penetrates the path of the rotating blades 3 adjacent the nose 8. By reason of the vortex, fluid is induced to flow from the suction region (defined by the nose 8 on one side of the rotor 1 and the wall 7 at its line 10 of nearest approach thereto on the other) through the path of the rotating blades 3 to the interior of the rotor and thence again through the path of the rotating blades to the outlet passageway 11. The flow takes place along lines (indicated at F) which are strongly curved about the vortex core V and which lie in planes perpendicular to the rotor axis: the fastest stream tubes lie adjacent this core. The vortex flow is further described in British patent specification No. 876,611.

Figure 2A:
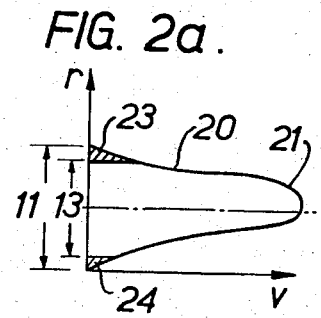
FIGURE 2a is a graph illustrating the distribution for velocity in the machine of FIGURES 1 and 2.

FIGURE 2a shows at 20 the velocity distribution curve or "profile" in the outlet passageway 11, which by reason of the vortex is characterized by a strongly marked and asymmetrical peak 21 where the velocity is several times the peripheral speed of the rotor. By contrast, flow adjacent the walls 7 and 9 is slow. If the entire throughput in the outlet 11 were led into a diffuser only a small proportion of the kinetic energy of the fluid could be converted to static pressure, because only a small divergence of the diffuser walls could be tolerated owing to the slow speed of the flow adjacent to them: if it were attempted to use a diffuser of wider angle, then the energy losses, due to break-away of the slower stream tubes and mixing of slower and faster stream tubes, would become intolerable.

The FIGURE 1 machine further includes a diffuser 12 having its inlet 13 opposite the outlet passageway 11 and slightly spaced from the plane 14 in which it terminates. The diffuser inlet 13 is smaller than the outlet passageway 11 so that an annular gap 14a is formed about the diffuser inlet. Fluid flowing adjacent the walls 7, 9 of the outlet passageway 11 is discharged through the gap 14 into the ambient fluid, and only the central body of fluid in the outlet passageway enters the diffuser inlet 13.

The diffuser 12 thus provides, in the region of its inlet 13, a dividing wall extending in the direction of fluid flow and separating slower stream tubes from the faster stream tubes; only the latter enter the diffuser for partial conversion of their kinetic energy to static pressure.

In FIGURE 2a the portions of the flow excluded from the diffuser 12 are shown by the shaded areas 23, 24. Flow adjacent the diffuser walls takes place at a considerable speed so that breakaway and mixing losses are reduced, despite relatively large divergence of the diffuser walls at its outlet 15.

The blower illustrated in FIGURE 1 is coupled to a system indicated purely diagrammatically at 5 having means, here shown as a filter F′ which imposes a resistance in the system, which increases as the filter becomes progressively more clogged.

A simple "tangential" machine would not have the gap 14a above mentioned. The system S would be connected directly to the outlet passageway 11, which would in general be formed as a diffuser.

As shown in FIGURE 2, the rotor 1 has one end mounted on the shaft of a shaded pole A.C. induction motor M; the other end of the rotor is rotatably mounted at 30. The characteristic of a conventional motor of this type is illustrated in FIGURE 5. Such motors have hitherto been operated in the upper part of their characteristic. The invention by contrast proposes to operate the motor in the lower part of the characteristic where the slope of the curve is great, as will be explained more fully below.

Figure 3:
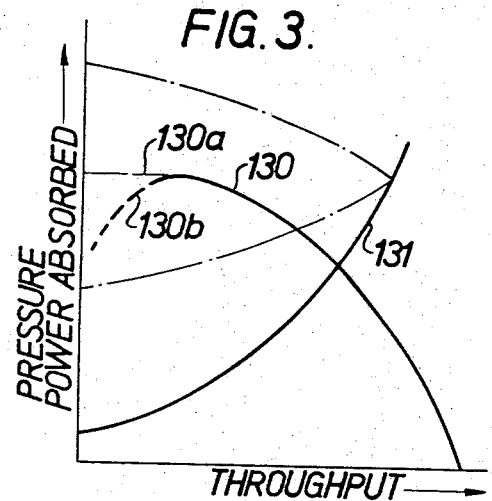
FIGURE 3 is a graph illustrating the relation of pressure to throughput and power taken to throughput in a blower as illustrated in FIGURES 1 and 2.

A typical characteristic curve of a blower as described with reference to FIGURE 1 is shown at 130 in FIGURE 3, while the relation of power taken to throughput is illustrated at 131. As the blower, running at constant speed, is throttled progressively from the free-blowing condition, the pressure rises to a high point at about 50% of maximum throughput. With the rejection of slow flow illustrated in FIGURES 1 and 2, pressure remains high on further throttling, as shown at 130a. The characteristic of a simple tangential machine with this feature omitted may however drop from the high point on further throttling, as shown at 130b: this part of the characteristic is unstable and cannot be used. The power taken drops markedly on throttling, as shown by curve 131.

Figure 4:
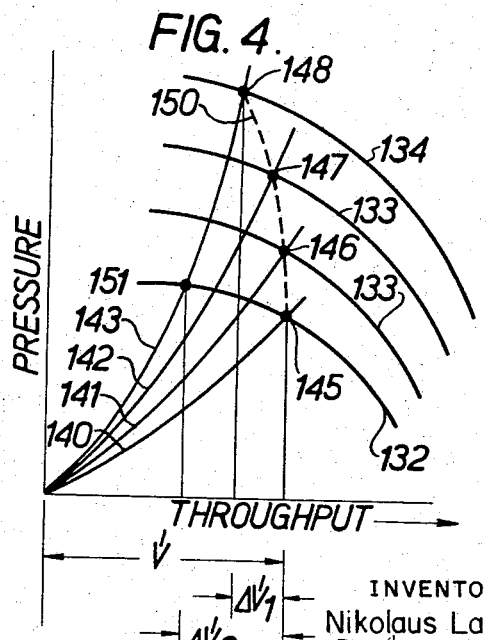
FIGURE 4 is a graph showing a series of pressure/throughput curves and a series of system resistance curves for a blower as illustrated in FIGURE 1.

FIGURE 4 shows portions of a family of characteristic curves 132 to 134, representing the relation of pressure to throughput at successively increasing rotor speeds, corresponding to the series of system resistance curves 140 to 143 representing the back pressure imposed by the system at different throughputs, for example as the filter in FIGURES 1 and 2 becomes progressively clogged.

The motor blower combination illustrated is designed to operate initially at a throughput V represented in FIGURE 4 and with an initial system resistance represented by the curve 140, but to accommodate an increase of system resistance, such as might occur on progressive clogging of the filter F. The power absorbed by the blower under the initial conditions is such as to reduce the speed (as above mentioned) well below its synchronous speed and well below the speed at which such a motor would normally be run. At this speed, any decrease in load causes appreciable increase of speed.

Under initial conditions, when the system resistance is as shown by curve 140, and the corresponding characteristic is that shown at 132, the operating point is at 145 where the characteristic intersects the resistance curve. When the system resistance increases to the curve 141, the corresponding throttling reduces the power required from the motor, so that motor speed increases, and the fan operates on characteristic 133. The operating point for the new working conditions is now at 146, where the characteristic 133 intersects the resistance curve 141. As the resistance further increases to the conditions illustrated by resistance curves 142, 143, power taken drops and the motor speed rises again so that characteristics 134, 135 successively obtain; the working point rises successively to 147 and 148.

Thus, joining the successive working points 145 to 148 it will be seen that the motor-blower combination operates over the curve 150 as the system resistance increases. This curve 150 shows a small drop $\Delta \dot{V}_1$ throughput between the points 145 and 148: however, if the blower had been coupled to a constant speed motor the characteristic 132 would apply in all conditions of resistance, and the corresponding throughput drop would be represented by the horizontal distance $\Delta \dot{V}_2$ between the points 145, 151. Thus the motor blower combination described has a substantially reduced throughput drop on increased system resistance, as compared with a constant speed blower.

FIGURE 5 shows a typical speed-torque characteristic 200 in a shaded-pole A.C. induction motor. The motor has a maximum speed at the point 201 which is near the synchronous speed: here the torque is zero. As the speed drops the torque increases. The slope of the curve 200 is gentle at first, but then increases rapidly to the stalling point 202, beyond which torque decreases as the speed drops down to the starting torque at point 203. Normal practice has been to operate the motor in the range between the points 200, 201 indicated by the bracket 204 and termed the normal working range, giving an acceptable torque range without excessive speed variation. The normal working range is not extended to the point 202, because just above this point slight torque variations cause large speed variations and because the slightest increase in torque beyond that at the point 202 will stall the motor. The range of the characteristic curve 200 below the point 202 is termed the stalling range; in conventional practice the motor is started through this range but operation takes place only in the working range. Torque speed characteristics for the blower under progressively increasing throttling conditions are shown at 211, 212, 213, 214. The relation of the curves 211–214 to the motor characteristic 200 illustrates the invention, which as explained above comprises operating a combination of a motor of particular characteristic and a flow machine of cross flow type over a range of the motor characteristic where speed varies greatly with torque. Thus the motor-blower combination may operate above the point 202 and below the normal working range 204, as illustrated by the intersection of blower curves 213, 214 with the motor characteristic 200. If curve 213 represents the unthrottled condition of the blower, the motor-blower combination in this condition operates at point 220, where curves 200 and 213 intersect. In the throttled condition illustrated by curve 214, the combination operates at the point 221, i.e., at slightly lower torque but considerably higher speed.

It is preferred however to operate in the stalling range 205, at least in the unthrottled condition. Thus the unthrottled and throttled conditions of a blower may be represented by curves 211, 212 or by curves 212, 214. In this way a considerable speed increase can be obtained on throttling, tending, as above explained to restore the throughput in the throttled condition to what it was in the unthrottled condition, or nearly so, which, as explained above, is the main object of the invention.

In this specification the expression "throttling" is intended to cover change of back pressure not only by means of a regulable flow-reducing member, but also by means of a system that, by its nature produces back pressure, which may be variable, and a system including a portion (for example a chimney), which imposes a pressure difference, which again may vary.

The term "vortex of Rankine type" as used herein includes not only a flow condition according exactly with the physical concept of a Rankine vortex, but also approximations thereto. In any actual "tangential" flow machine, the flow conditions will always be more or less of an approximation.

A further development of the invention will now be discussed with reference to FIGURES 6 to 10, which illustrate how the appreciations underlying the foregoing may be refined to produce apparatus which approaches more exactly to constant throughout under varying system resistance.

According to this further development of the invention, the characteristics of a given blower are studied experimentally and converted theoretically into the form of constant volume lines on a torque/speed curve. The driving motor is then chosen to provide a torque/speed characteristic which as near as possible follows a desired constant volume line. This will require that the motor be of shaded pole induction type, operating in the stalling range, or an equivalent motor.

Figure 6:
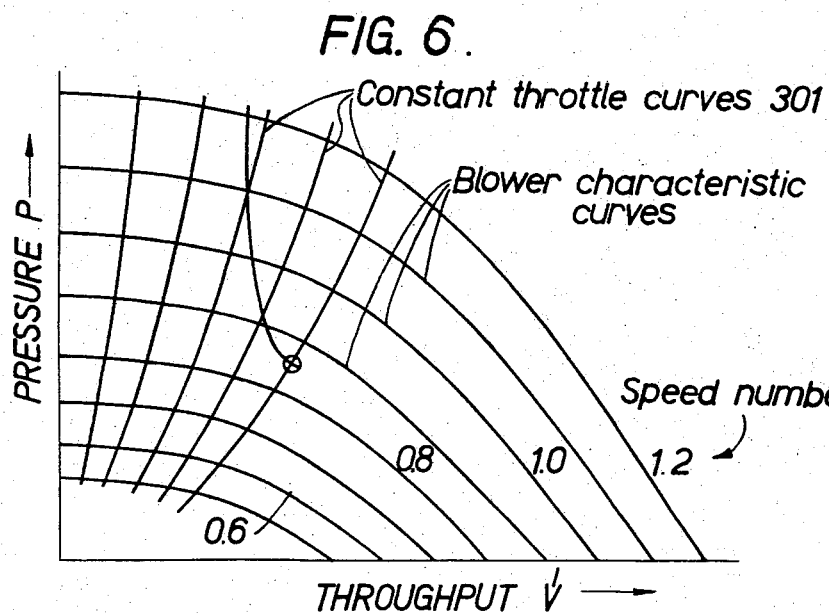

FIGURE 6 shows a series of characteristic curves for a blower constructed on the general lines illustrated in FIGURES 1 and 2. Each curve is taken at a fixed speed of revolution, the speed varying as shown by the numbers against the curves. Also plotted on FIGURE 6 are a series of constant throttle curves 301.

It will be assumed that efficiency is a function of volume independent of speed, and this has been found to be true experimentally, working with the blower of FIGURES 1 and 2, over a working range. The effective power output of the blower is the product of pressure and throughput, and the input torque is equal to the output, that is the product of pressure and throughput, divided by the efficiency and rotational speed. Hence it is possible to deduce the curves of FIGURE 7 which show a series of curves of torque against throughput for a series of different rotor speeds, denoted by numbers corresponding to those of FIGURE 6.

Figure 7:
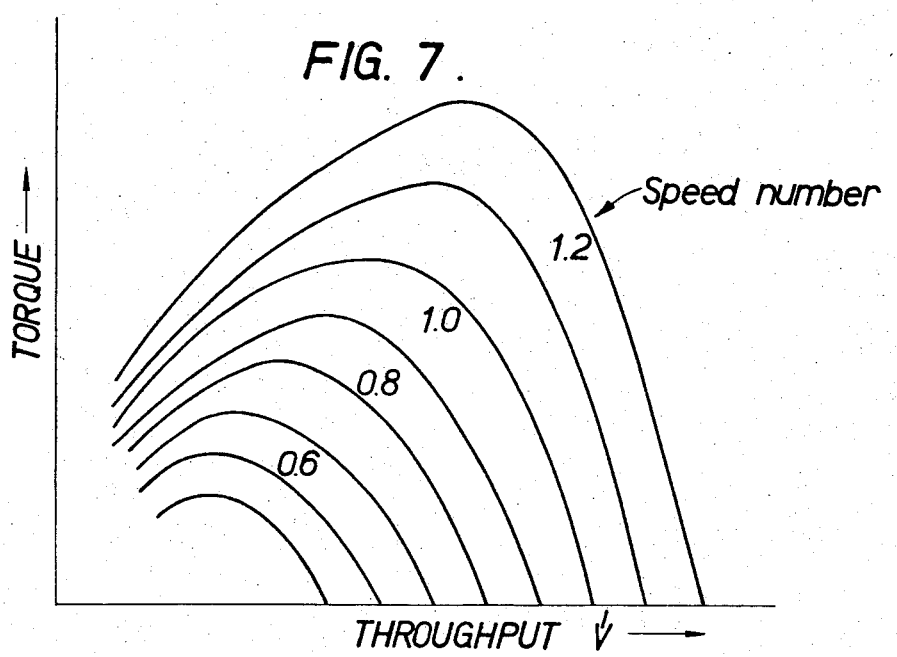

By erecting ordinates at different points along the abscissa in FIGURE 7, the curves of this figure can be transformed to constant volume curves on a graph of torque against rotational speed, as shown in FIGURE 8. Once again, the rotational speed is designated by numbers corresponding to those of previous figures, while the constant volume curves are marked with volume numbers. It is found that the constant volume lines are virtually straight lines (they are in fact shown as such in the figure) the gradient decreasing at reduced volume, but always remaining positive.

Figure 10:
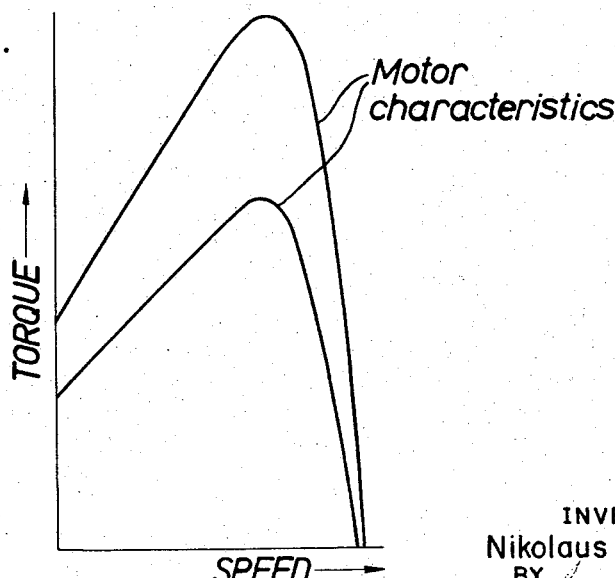

The invention in its present aspects depends in part on the appreciation that for constant volume it is desirable to have a motor characteristic which runs as nearly as possible along a desired constant volume line. This demands a characteristic which at first sight is peculiar, in that torque rises with the rotational speed. The invention in this aspect depends in part on the further appreciation that a shaded pole induction motor, in its stalling range, can produce the desired characteristic. A portion of such a motor characteristic is shown at 310. It is of course to be appreciated that different motors produce characteristics of different sorts, and two possible motor characteristics are shown in FIGURE 10. The invention in this aspect requires that the stalling ranges of different motor constructions be compared with a given constant volume line on the torque/speed curves such as shown in FIGURE 8, to choose a motor construction appropriate to the blower and desired body. It will not in general present any difficulty to match the constant volume line with an appropriate motor, since most manufacturers publish the characteristic curves of their motors. A large number of different kinds of shaded pole induction motors are available commercially all having varying chracteristics of the general form shown in FIGURE 10.

Figure 9:
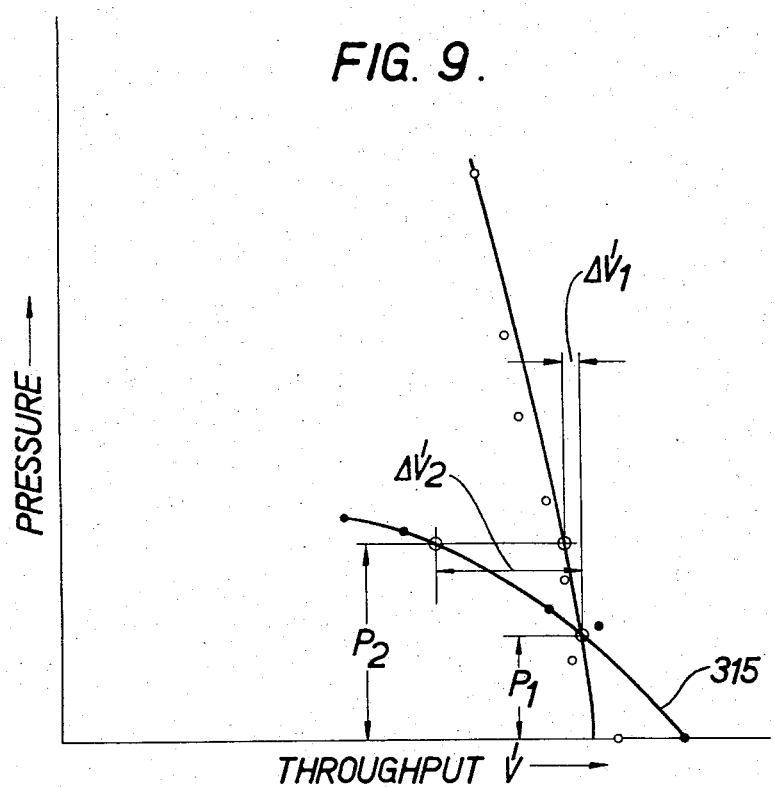

FIGURE 9 shows two blower characteristics, the first (reference numeral 315) corresponding to the curves 300 of FIGURE 6 and being taken from a blower constructed as in FIGURES 1 and 2, driven at constant speed. Characteristic 316 is however taken from the same blower driven by a motor, chosen as above described. If it be assumed that the blower is in each case operating in conjunction with a system having a resistance which varies, so as to set up a back pressure varying between $P_1$ and $P_2$, then it will be seen that the combination in accordance with the invention delivers a substantially constant pressure, while when the blower is driven at constant speed, the pressure drops very substantially. In fact, the combination according to the invention results in a small drop in throughput of $\Delta \dot{V}_1$, as compared with the large drop $\Delta \dot{V}_2$ at constant speed.

I claim:

1. In combination a fluid utilization system, a fluid flow machine for producing fluid flow in said system, an electric motor for driving the machine, and variable throttling means in said system for varying pressure drop over the fluid flow machine over a period of time; said fluid flow machine being of the cross-flow type having a bladed cylindrical rotor mounted for rotation about its axis driven by said motor and guide means extending the length of the rotor and defining therewith suction and pressure regions where the guide means and rotor cooperate on rotation thereof in a predetermined direction to set up a fluid flow through the rotor generally transverse to the rotor axis from the suction region through the path of the rotating blades of the rotor to the interior of the rotor and thence again through the path of the rotating blades of the motor to the pressure region, and said motor being of the type having at constant voltage and speed-torque characteristic curve having a normal working range of small positive slope and a lower working range of a steep slope and of a negative slope and wherein said motor is matched with said motor to operate under normal operating conditions of said system when said pressure drop is at a minimum over the lower working range of its speed-torque characteristic curve whereby when said pressure drop increases due to increase in back pressure caused by variation of said throttling means, the speed of said motor will increase to compensate for increase in back pressure to maintain substantial throughput through the system.

2. The combination as claimed in claim 1 wherein the motor is an A.C. shaded pole induction motor.

3. In combination, a fluid utilization system, a fluid flow machine producing fluid flow in said system, variable throttling means in said system for throttling fluid flow therethrough to vary over a period of time the pressure drop over the fluid flow machine, and an electric motor driving the machine; said fluid flow machine comprising a bladed cylindrical rotor mounted for rotation about its axis driven by said motor and guide means extending the length of the rotor and defining therewith suction and pressure regions with the guide means and rotor cooperating on rotation thereof in a predetermined direction to form a vortex of Rankine type having a core region interpenetrating the path of the rotating blades of the rotor at a location eccentric of the rotor axis and between the suction and pressure regions whereby the vortex guides fluid flow through the rotor generally transverse to the rotor axis and long lines about the core region from the suction region through the path of the rotating blades of the rotor to the interior of the rotor and thence again through the rotating blades of the rotor to the pressure region; said motor being of the type having at constant voltage and speed-torque characteristic curve wherein said curve has a normal working range of small positive slope and a lower working range of a steeper slope and of a negative slope and wherein said motor is matched with said rotor to operate when said pressure drop is at a minimum in the lower working range whereby when said pressure drop increases over said fluid flow machine due to increase in back pressure caused by variation of said throttle means, the speed of said motor increases to compensate for increase in back pressure to maintain substantially constant throughput in said system.

References Cited

UNITED STATES PATENTS 2,355,175  8/1944  Olving _____ 230—117
2,942,773  6/1960  Eck _____ 230—125

HENRY F. RADUAZO, *Primary Examiner.*

DONLEY J. STOCKING, *Examiner.*

UNITED STATES PATENT OFFICE
CERTIFICATE OF CORRECTION

Patent No. 3,361,341                          January 2, 1968

Nikolaus Laing

It is certified that error appears in the above identified patent and that said Letters Patent are hereby corrected as shown below:

Column 2, line 8, and column 5, line 69, for "throughout", each occurrence, read -- throughput --; column 6, line 39, for "rises" read -- rises --, in italics; line 56, for "chracteristics" read -- characteristics --; column 7, line 15, for "motor" read -- rotor --; line 16, for "and" read -- a --; line 20, for "motor", second occurrence, read -- rotor --; column 8, line 11, for "long lines" read -- along lines curved --; line 16, for "and" read -- a --.

Signed and sealed this 24th day of June 1969.

(SEAL)
Attest:

Edward M. Fletcher, Jr.
Attesting Officer

WILLIAM E. SCHUYLER, JR.
Commissioner of Patents